J. A. CLUXTON.
Grain Measurer and Register.

No. 31,530.

2 Sheets—Sheet 1.

Patented Feb. 26, 1861.

J. A. CLUXTON.
Grain Measurer and Register.

No. 31,530.

2 Sheets—Sheet 2.

Patented Feb. 26, 1861.

UNITED STATES PATENT OFFICE.

JOHN A. CLUXTON, OF BENTONVILLE, OHIO.

GRAIN MEASURER AND REGISTER.

Specification of Letters Patent No. 31,530, dated February 26, 1861.

*To all whom it may concern:*

Be it known that I, J. A. CLUXTON, of Bentonville, in the county of Adams and State of Ohio, have invented a new and Improved Machine for Measuring and Registering Grain; and I do hereby declare that the following is a full, clear, and exact description thereof, reference being had to the accompanying drawings, making a part of this specification, in which—

Figure 1:
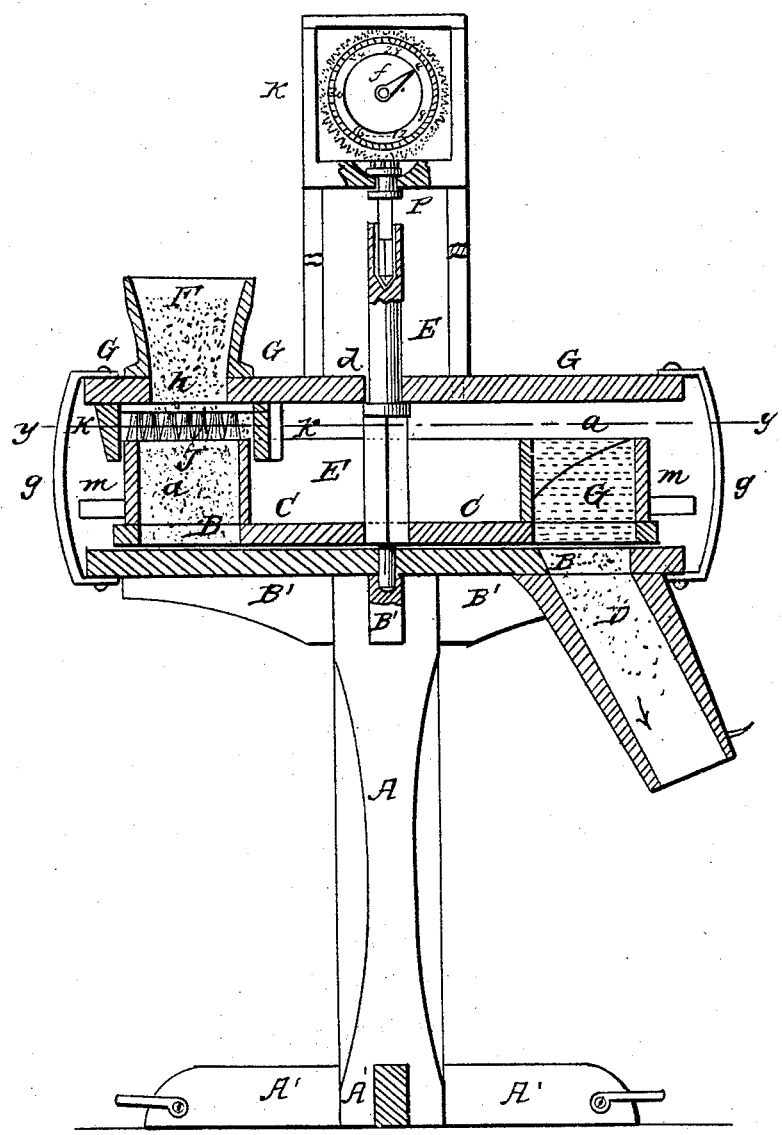
Figure 2:
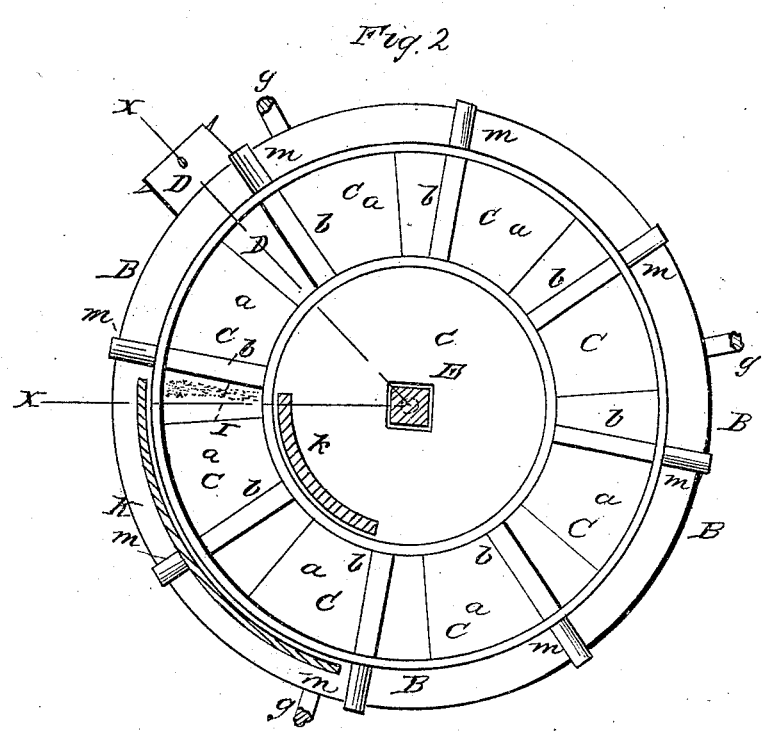

Figure 1. is a vertical section taken through the improved machine, as indicated by the course of red lines $x$, $x$, in Fig. 2. Fig. 2. is a section through Fig. 1. taken in the horizontal plane indicated by the red line $y$, $y$, marked thereon.

Similar letters of reference indicate corresponding parts in both figures.

To enable those skilled in the art to fully understand my invention I will proceed to describe its construction and operation.

A. is a pedestal with four right angular feet A'. A'. projecting out from its sides at the bottom, which may be secured rigidly down in any convenient manner to the floor of the building in which grain is to be measured.

The pedestal projects up perpendicularly from the floor or base on which it rests a suitable distance, and forms the central support for a circular disk, B. of wood or metal—as the case may be,—which is firmly secured to the pedestal A. and to the arms B'. which project out from the pedestal under the disk B. The disk thus being immovably fixed to the pedestal A. it is thus held in a horizontal plane and made to form the floor or bottom for a circular chain of measuring boxes or cells $a$, $a$, $a$, $a$, etc. which may be made of any desirable size, holding from a small measure to a half-bushel, or a bushel, and any number of these cells may be put together. The cells $a$, $a$, are put together and secured to a circular bottom board C. which is nearly of the same diameter as the board B.; and each cell is divided from the other by a radial partition $b$, Fig. 2. which extends from the bottom to the top of each cell.

The cells have no bottom but each cell has an inclined board $c$, in it which leaves an opening in each of sufficient size for the grain to flow freely out. These measuring cells are mounted on the floor B. as shown in Fig. 1, which floor serves as a bottom for all the cells but one, that is to say—the circular disk B. prevents grain from escaping from all but one cell $a$, and at this point, a hole corresponding to the opening through the bottom of each cell is made through the disk B. and under this hole a spout D. is arranged which will conduct the grain from each cell in its turn, and carry it off to a proper place for its deposit. I have represented only one of these spouts but more may be used if found desirable.

E. is a square shaft which passes through the center of the board C. and has its bearings in the center of the disk B. and standard A. as shown in section in Fig. 1. This central shaft projects perpendicularly up some distance above the horizontal plane of the top of the cell box, and has a collar $d$, formed on it, it continues above this collar and has a square hole formed in its end which enters the axis of the shaft an inch or so.

G. is a circular disk which is equal in diameter to the lower disk B. and which is supported in a parallel plane with the lower disk B. a short distance above the top of the measuring cells $a$, $a$, by three or more arms $g$, $g$, $g$, which are attached to the edge of the lower disk B. and project up and are attached to the upper disk G. so as to keep this latter disk in a firm immovable state in the position in which it is represented in Fig. 1. The central shaft E. passes through the center of the upper disk G. and the middle of this disk rests on the collar $d$, of shaft E. This disk G. serves as the upper bearing for the shaft E. and keeps this shaft in a steady position.

At a suitable point over the measuring cells $a$, $a$, a hole $h$, is made through the disk G. which is surrounded on top of the disk with a hopper F. This hole through the disk G. is similar, both in its shape and size, to the top of the measuring cells $a$, $a$. On each side of hole $h$, and on the bottom of the disk G. is a curved guard plate $k$, these guards project down below the top of the measuring cells and fit closely to each side of these cells, and extend in length about the length of two cells. J. is a row of brushes which project down from the disk G. and extend across the cells and in front of the hopper hole $h$, and operate upon the top of the cells $a$, $a$. The relative position of the brushes with the curved guards $k$, $k$, is shown in Fig. 2. The arms $m$, $m$, $m$ which are represented as projecting from the circumference of the measuring box, are used to rotate this measuring box.

On top of the disk G. and erected on four legs is a box K. which contains a train of wheel-work which operates an index hand, $f$, which is on the outside of the box K. and which is covered with a glass plate. This hand $f$, points to an index in its revolutions and every time a discharge takes place from one of the cells $a$, through the spout, it is registered by the index hand. The short square shaft P, which fits into the hole in the top of shaft transmits motion to the train of wheel work in box K.

The operation of the machine is as follows: Grain is conducted through a trough into the hopper F. in a regular continuous stream and the board C. with its cells $a$, are rotated by means of the handles $m$, $m$, in the direction of the arrow in Fig. 2. The grain flows from the hopper F. through hole $h$, into the cells $a$, $a$, and each cell is filled as it is brought under the hopper F. and the grain is leveled by brushers J. the guards $k$, $k$, prevent the grain from falling over the sides of the cells.

The cells $a$, are each filled in this way and in their turn brought over the spout D. where they are discharged of their grain. The inclined bottoms $c$, prevent any grain from lodging in the cells when they are brought over the spout D. The central shaft E. turns with the cell board C. and gives motion to the hand $f$, through the medium of shaft P. and a train of wheel work inclosed in box K. and the hand $f$, points to figures which indicate the exact amount of grain measured in bushels and fractions of a bushel. The cell boxes $a$, are rotated with the hand and the measuring of grain can be stopped at any moment.

Having thus described my invention what I claim as new and desire to secure by Letters Patent, is.

A grain measurer and register composed of a measuring wheel or board C having cells $a$ $a$, disks B. G, spouts F. D, shafts E. P, and indicating or registering wheels and pointer $f$, when said parts are arranged, constructed and operate together in the manner and for the purpose herein shown and described.

JOHN A. CLUXTON.

Witnesses:
SAML. BURWELL,
ED. M. DE BRUIN.